United States Patent [19]
Gilbert et al.

[11] Patent Number: 5,870,316
[45] Date of Patent: Feb. 9, 1999

[54] METHODS OF USING SIMULTANEOUS TEST VERIFICATION SOFTWARE

[75] Inventors: Bernard Gilbert, Westford; Keith Westgate, Andover; Richard Sayde, Littleton, all of Mass.

[73] Assignee: Quickturn Design Systems, Inc., San Jose, Calif.

[21] Appl. No.: 761,285

[22] Filed: Dec. 6, 1996

[51] Int. Cl.⁶ .................................................. G06F 17/50
[52] U.S. Cl. .......................................... 364/578; 364/488
[58] Field of Search ..................................... 364/578, 488

[56] References Cited

U.S. PATENT DOCUMENTS 5,696,942  12/1997  Palnitkar et al. ...................... 364/578

Primary Examiner—Vincent N. Trans
Attorney, Agent, or Firm—Brian M. Dingman

[57] ABSTRACT

Methods of speeding error analysis of electronic devices under test using simulation software that has the capability of simultaneously executing up to 32 tests on one image of the design model. One embodiment of the method contemplates executing the tests staggered in time so that a larger portion of the test is available for examination and execution at any given time. This allows errors to be found more quickly. Another embodiment contemplates more quickly testing a device initialization sequence by randomly establishing values for each state device, separately for each of the 32 tests, running the simulation, and then determining whether the state device values converge.

17 Claims, 4 Drawing Sheets

METHODS OF USING SIMULTANEOUS TEST VERIFICATION SOFTWARE

FIELD OF THE INVENTION

This invention relates to methods of using the simultaneous test feature of electronic device design test software to check the initialization sequence of the device under test, and to more quickly and easily test large device designs.

BACKGROUND OF THE INVENTION

Cycle-based simulation software is used to simulate electronic devices to decrease the cost and complexity of building large electronic systems, microprocessors, and ASICs. Such simulation software is much faster than event-driven simulators, and has performance levels that approach those of more expensive hardware accelerators.

One cycle-based simulation software product, SpeedSim/3 available from SpeedSim, Inc. of Chelmsford, Mass. is able to perform up to 32 tests simultaneously on one image of the design model on a single workstation. This technique of simultaneously running multiple diagnostics or application program streams results in a 5 to 10 times performance gain in total throughput.

Large microprocessors include many state devices. When such microprocessors are powered up, the values of the state devices are unknown. However, their values must converge each time an initialization sequence is completed. The SpeedSim/3 product is a two-state simulator that does not have the provision for simulating an unknown state. Accordingly, the SpeedSim/3 product must assign a value of 1 or 0 to any state device involved in the test. When the initialization sequence of a device under test is being tested, for the test to be successful the output pin values of all of the state devices must converge to a single solution after each initialization sequence test. If the value of even a single state device changes from one initialization sequence to another, there is a design problem which must be resolved. Thus, to use a two-state simulator to test device initialization sequences, provision must be made for the inability to simulate an unknown state.

Large device designs require lengthy test procedures. Some designs can take days to test using cycle-based simulation software such as the SpeedSim/3 product. If an error occurs during the test, it can be extremely time consuming to find the error source. To do so typically requires the creation of a tracing file that slows the simulation test, and creates a large data file that must be reviewed to pinpoint the error. Alternatively, the simulation can be rerun, and the data can be saved for analysis. In either case, it is extremely difficult and time-consuming to locate the source of an error. Additionally, these error pinpointing procedures tie up valuable test hardware that could be used to perform additional testing.

SUMMARY OF THE INVENTION

It is therefore an object of this invention to provide methods of speeding simulation testing of large microprocessors and other circuits.

It is a further object of this invention to provide such a method that finds errors without the need to repeat the full simulation.

It is a further object of this invention to provide such a method that allows a portion of a simulation to be reviewed in detail, without the need to save large data files.

It is a further object of this invention to provide such a method that quickly provides a high confidence in the initialization sequence of the device under test.

This invention features a method of speeding error analysis using cycle-based verification software for simulation of electronic device designs, in which the software is capable of simultaneously executing a plurality of simulation tests along separate test pathways, the method comprising the steps of:

a. initiating a simulation test along a first test pathway;

b. waiting a predetermined time interval; and then c. initiating the same simulation test along a different test pathway; whereby the initiated simulation tests proceed simultaneously, but staggered in time, to allow analysis of electronic device design errors by comparison of test results from different test pathways.

This method preferably further includes repeating steps b. and c. one or more times to increase the number of staggered simultaneously-running simulation tests, and thereby increase the amount of the simulation test encompassed by the simultaneously-running simulation tests, to allow more of the test to be reviewed upon detection of a design error. This method also may further include the step of selecting the predetermined time interval based on the software cycle time. The cycle time may be multiplied by a factor, to determine the predetermined time interval. The method may also include the step of stopping all of the simultaneously-proceeding simulation tests, and then moving the simulation tests back in time, to allow a segment of the simulation test to be reviewed. The simulation test may then be restarted along the test pathways, to review at least a portion of the simulation test, to allow further analysis of a test event.

This invention also features a method of using two-state simulator software for simulation of the initialization sequence of electronic device designs having state devices each with a value of 1 or 0 and an output, in which the software is capable of simultaneously executing a plurality of initialization simulation tests along separate test pathways, the method comprising the steps of: establishing the values of at least some of the state devices for a plurality of the active test pathways along which simulation tests are to be run, such that the values of the state devices are not identical in all of the active test pathways; initiating and completing the same simulation test along each active test pathway, to run the state devices through an initialization sequence; and after completion of the initialized simulation tests for each active test pathway, determining the values of the state devices at their outputs, to allow analysis of whether the state device values converge to a single solution after initialization, regardless of their initial values, to test for electronic device design errors. This method may further include the step of comparing the determined state device values from the different active test pathways to determine whether the values of the state device converged to a single solution. Establishing the values of at least some of the state devices may include establishing the value of each state device. Establishing the values of at least some of the state devices may also include establishing a value of 1 for each of the state devices for a first active test pathway, and establishing a value of 0 for each of the state devices with a value of 1 for the first active test pathway, for a second active test pathway, so that each tested state device is tested with both possible values.

The step of establishing the values of at least some of the state devices may further include the step of randomly developing values of 1 or 0 for each of the state devices with a value of 1 for the first active test pathway and 0 for the second active test pathway, for at least one additional active test pathway.

BRIEF DESCRIPTION OF THE DRAWINGS

Other objects, features and advantages will occur to those skilled in the art from the following description of the preferred embodiments, and the accompanying drawings, in which.

DETAILED DESCRIPTION OF THE PREFERRED EMBODIMENTS

This invention may be accomplished in software which speeds the testing of large devices using cycle-based, two-state simulation software that is capable of simultaneously executing a test procedure on one image of the design model on a single workstation. Such cycle-based, two-state simulation software with simultaneous-test capability is commercially available as SpeedSim/3 software from SpeedSim, Inc., Chelmsford, Mass.

Figure 1:
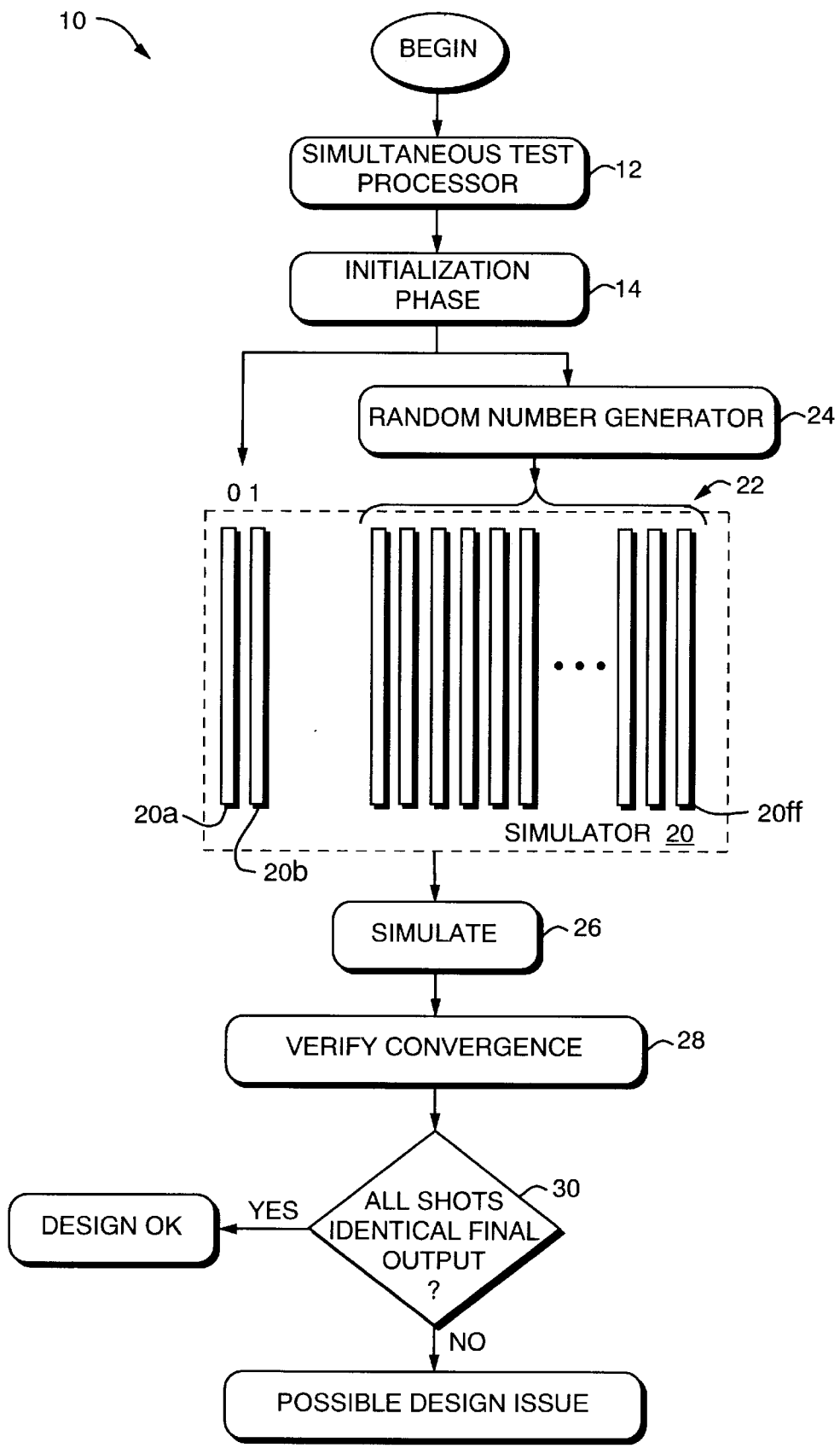
FIG. 1 is a flowchart of a preferred method of quickly simulating the initialization sequence of an electronic device design under test, according to this invention.

Flowchart 10, FIG. 1, depicts one preferred embodiment of the software of this invention. Such embodiment utilizes the simultaneous test feature of a cycle-based, two-state simulation software such as the SpeedSim/3 product. The software charted in FIG. 1 provides for a high degree of confidence that the initialization sequence of a device under test is correct, while requiring only a single pass through the test program.

There are two current methods for testing the initialization sequence of a device under test using simulation software. The first is to randomly establish input values on the input bus to the device under test, run the initialization sequence simulation, and read and save the device output values, and then repeat the process a number of times, each time with a different set of input bus values. If the initialization sequence is correct, the output values must converge (be the same at each output pin each pass through the initialization sequence) for all of the iterations of the initialization sequence simulation. The second method is to find each state device of the design under test, initialize them with a value of zero or one, run the simulation and compare the value of each state device with a predetermined correct value. Each of these methods is extremely time consuming, which ultimately adds to the device design cost, and may increase device design time.

The method of this invention set forth in FIG. 1 accomplishes the speedy verification of the initialization sequence of a device under test. The method 10 begins with the use of the simultaneous test processor 12, which is a feature of the SpeedSim/3 product detailed above. In initialization phase 14 the user is allowed to select the number of test pathways (or slots) along which a single initialization sequence simulation test will be simultaneously run. The user is also preferably allowed to choose a seed value for the random number generator 24, which randomly generates the initial values of the state devices, as describe below.

Initialization phase 14 sets the value of every state element to "0" for the test in slot 20a of multi-slot simulator 20, and to "1" for the test in slot 20b. For each of the other available simultaneous test slots 22, random number generator 24, which is input with the seed value chosen by the user, randomly sets the value of each state element to either 1 or 0. In the preferred embodiment in which there are 32 test slots in simulator 20, the last slot is labeled 20ff.

The next step is to run the simulation, step 26, simultaneously along each of the test slots. The state device values of 0 and 1 in the first two slots ensures that the two possible state device values are tested for each state device through the initialization sequence. Random number generator 24 ensures that the test results are statistically significant. At the completion of the test run, the output pin of each state device is read, and such values are automatically compared in all 32 slots to determine whether the values converged. The value of each state device should be the same across all of the simultaneous test slots. If they are, then the confidence level in the initialization sequence is increased.

Using different random initial value seeds, the above regression test can be run over and over automatically, to raise the confidence level in the initialization sequence. For example, a 1.3 million gate design that simulates at 10 cycles per second and requires 10,000 cycles to complete the initialization sequence would take 1000 seconds to complete. Since 32 initialization sequence tests are run simultaneously, 32 different initialization sequence tests would be completed in 1000 seconds. Thus, the simultaneous test feature dramatically decreases the amount of time necessary to develop a statistically significant understanding that the initialization sequence under test is correct.

Figure 2:
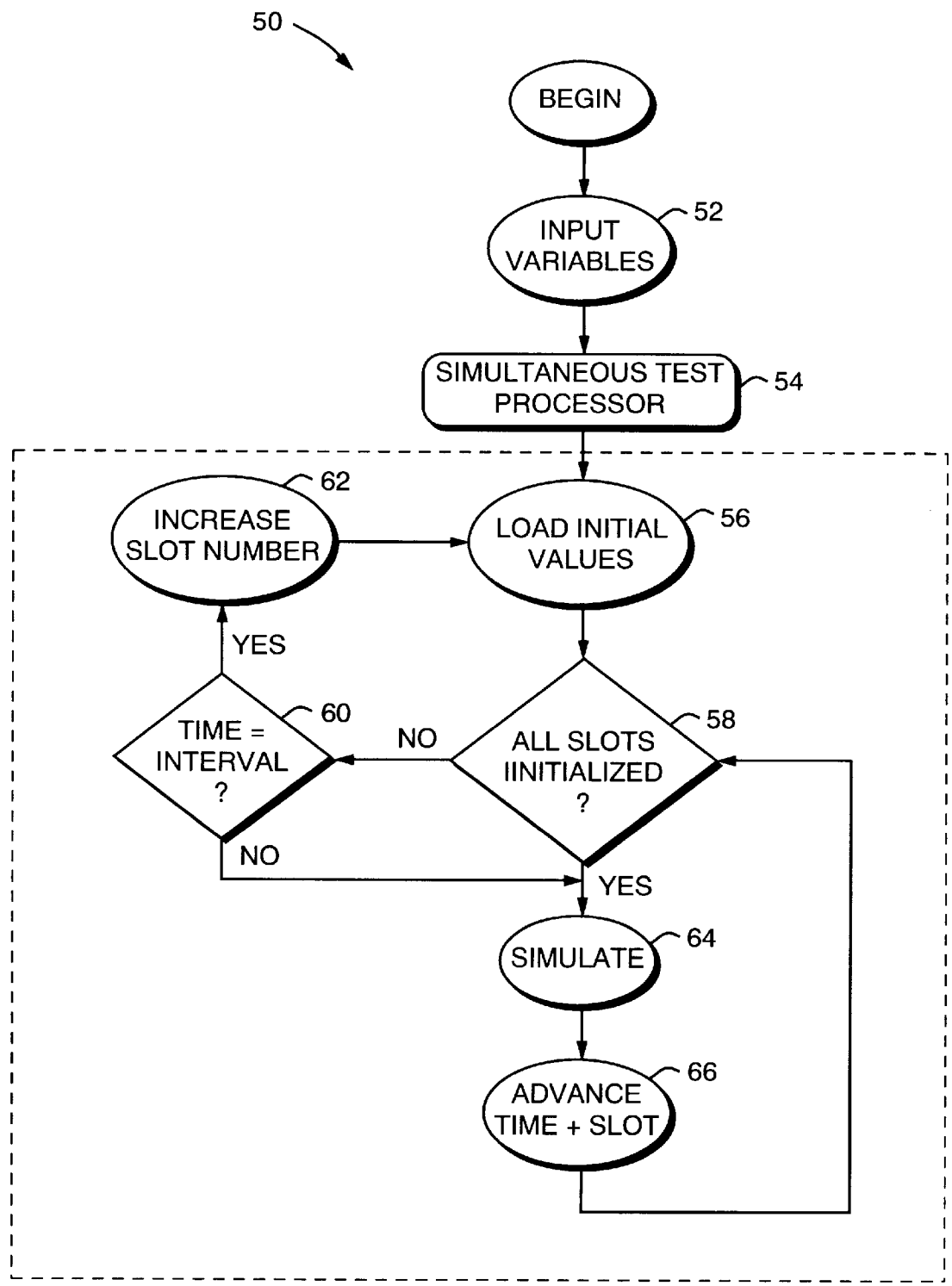
FIG. 2 is a flowchart of a preferred method of more quickly finding an error in a simulation, according to this invention.
Figure 3:
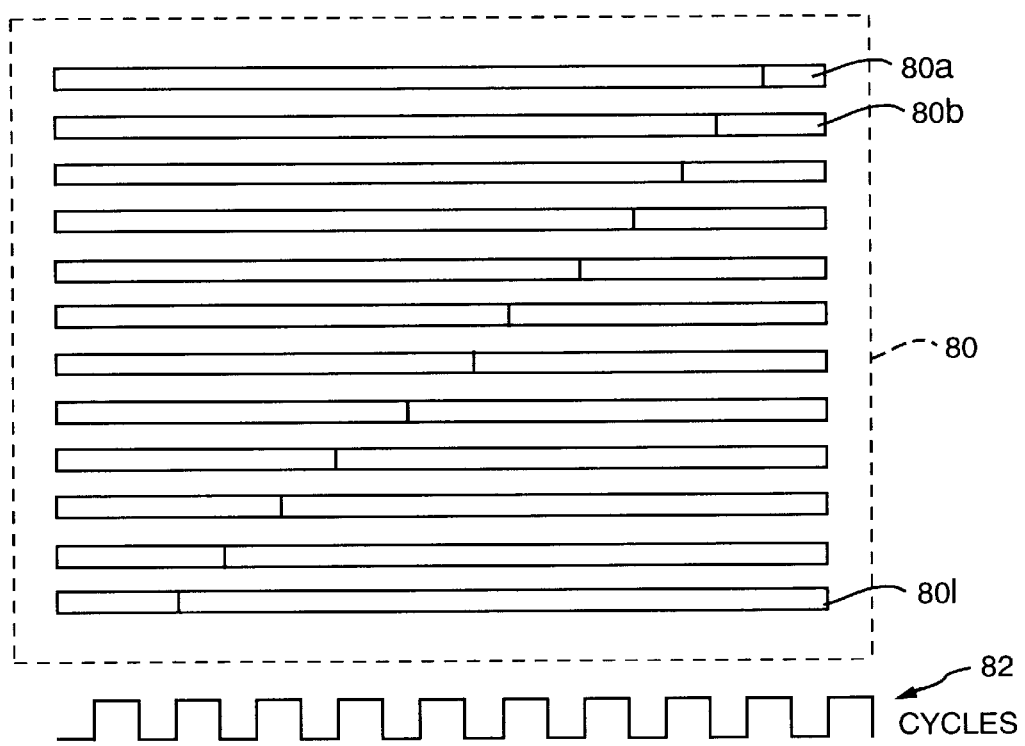
FIG. 3 is a simplified timing diagram illustrating staggered simultaneous testing accomplished in the software set forth in FIG. 2.
Figure 4:
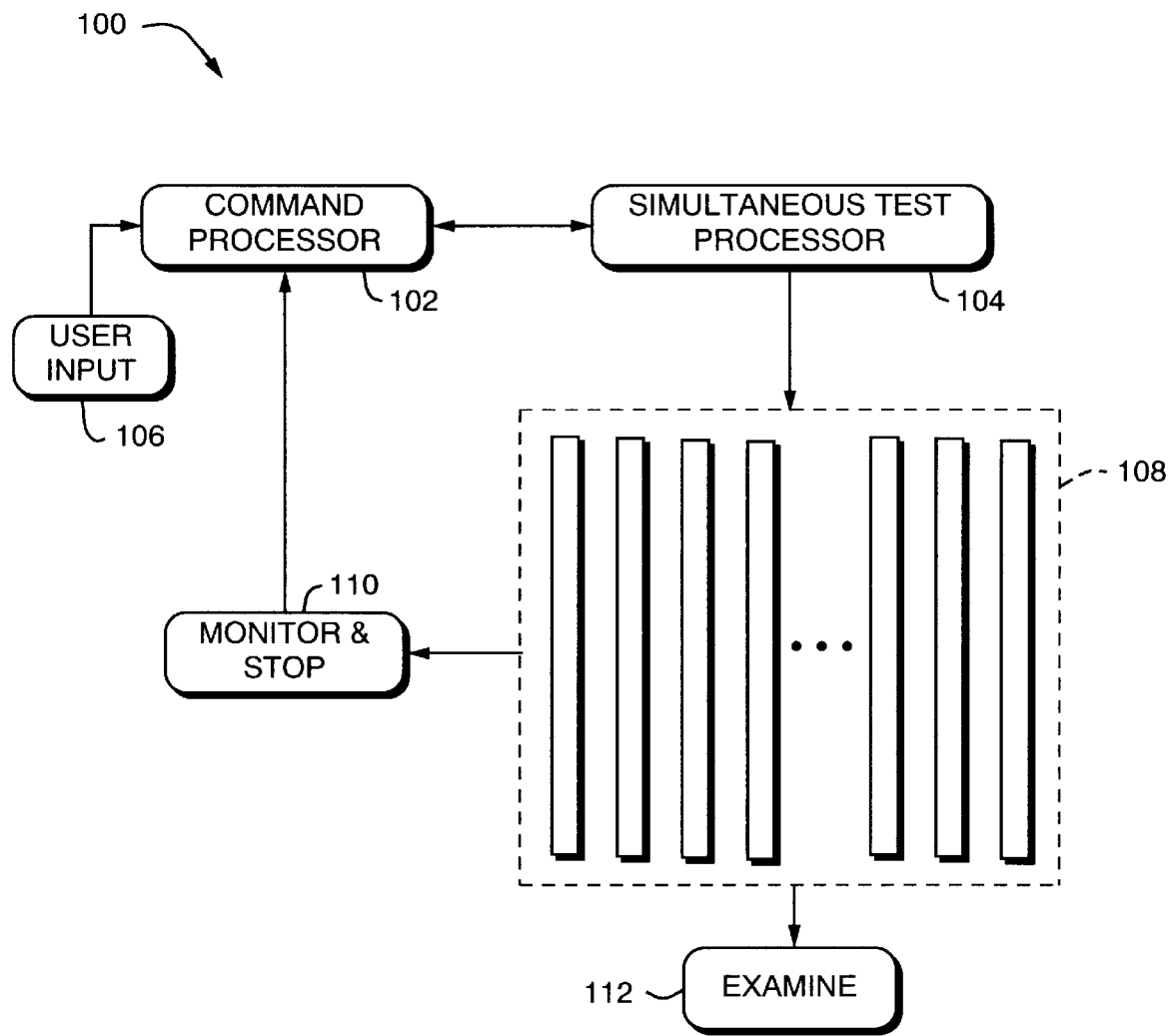
FIG. 4 is a block diagram illustrating the functional portions of the software of FIG. 2.

FIGS. 2–4 detail another preferred embodiment of this invention, in which the simultaneous test feature is used to quickly check large designs. When simulating large designs that can execute one test for hours or days before the simulation completes or an error occurs, it is often too complex and time consuming to rely on tracing signals to determine the cause of the error. Tracing signals can affect performance of the simulation, and generate extremely large trace files that must be tediously examined to find the error source.

Flowchart 50, FIG. 2, begins with the user input of the necessary variables, step 52. Since the simulation software is cycle-based, and can simultaneously run a single simulation test along as many as 32 test slots, the user is allowed to specify the number of cycles between the start of the test in each slot, and a non-linear multiplication factor by which the specified number of cycles can be multiplied in order to delay each slot by a variable time. The simultaneous test processor 54 is then brought up, and the initial test values for the design under test are loaded for the first slot, step 56. When all 32 test slots are not yet initialized, the software 50 utilizes the user-defined time, step 60, to initialize the next slot, step 62. This loop continues until the initial values are loaded for all of the slots. The simulation is then run, step 64. However, since there is a time delay between each slot, the simulations do not proceed in parallel. Rather, they proceed identically, but delayed in time, as determined by step 66. This is schematically depicted in FIG. 3, in which simulation 80 is depicted as having slots 80a–80l. The vertical lines in each simulation slot 80a–80l indicate the point along the simulation currently executing. The simulation in slot 80a is almost complete, and the simulation in slot 80l is closest to the beginning. Accordingly, in all, the in-process simulations encompass a total time from the point of the simulation in slot 80a to the point of the simulation in slot 80l.

When an error is detected, the simulations are stopped by the user, step 110. The user can then effectively examine the total time encompassed by all of the slots. If the error is present in one slot, but not the adjacent slot which began just after the slot in which the error was found, the user knows that the error occurred somewhere in the simulation after the point at which the simulation stopped in the adjacent slot, and before the point at which the simulation stopped in slot with the error. The user can then use command processor 102 to step the simulation back for a number of cycles. The backstep command controls which slot is active based on the number of steps the user requires to move back. The active slot is determined by calculating the number of intervals required to meet the number that must be backsteped. Since the time interval between each slot is specified by the user, each slot represents a different time window in the simulation of the design with known boundaries. If the amount of time required to backstep does not lie on a slot interval, the backstep command will select the previous slot that contains this time interval and the simulation will be automatically advanced to meet the specified number. This backstep command allows the user to move the time window encompassed by all of the slots in relation to the error point. The simulation can then be restarted and moved forward cycle-by-cycle until the event occurs. As a result, there is no need for large tracing signal files, and no need to fully rerun the simulation upon the occurrence of an error.

Flowchart 100, FIG. 4, begins with the user input 106 of the necessary variables establishing the time interval and the number of slots that will be used for the simulation. The command processor 102 is used to interact with the user by capturing input from the User Interface of the simulator and then dispatching the necessary variables to the Simultaneous Test Processor 100 to properly initialize the slots required by the simulation. The Simultaneous Test Processor 100 activates the slots in sequence based on the time interval specified by the user in step 106. A user supplied function 110 monitors the simulation running in slot 0, and upon the detection of an error instructs the command processor 102 to stop the simulation and to return to interactive mode. Once in interactive mode, the user can instruct the Simultaneous Test Processor 104, via the Command Processor 102, to backstep a specific amount of time then move forward until the condition generating the error condition is found.

Although specific features of this invention are shown in some drawings and not others, this is for convenience only as each feature may be combined with any or all of the other features in accordance with the invention.

Other embodiments will occur to those skilled in the art and are within the following claims:

What is claimed is:

1. A method of speeding error analysis using cycle-based verification software for simulation of electronic device designs, in which the software is capable of simultaneously executing a plurality of simulation tests along separate test pathways, the method comprising the steps of:
   a. initiating and conducting a simulation test along a first test pathway;
   b. waiting a predetermined time interval; and then
   c. initiating and conducting the same simulation test along a different test pathway;
   whereby the simulation tests proceed simultaneously, but staggered in time, to allow analysis of electronic device design errors by comparison of test results from different test pathways.

2. The method of claim 1 further including:
   d. repeating steps b. and c. one or more times to increase the number of staggered simultaneously-running simulation tests, and thereby increase the amount of the simulation test encompassed by the simultaneously-running simulation tests, to allow more of the test to be reviewed upon detection of a design error.

3. The method of claim 1 further including the step of selecting the predetermined time interval.

4. The method of claim 3 in which the predetermined time interval is selected based on the software cycle time.

5. The method of claim 4 in which selecting the predetermined time interval includes providing a factor by which the cycle time is multiplied to determine the predetermined time interval.

6. The method of claim 5 in which selecting the predetermined time interval includes establishing the factor.

7. The method of claim 1 further including the step of stopping all of the simultaneously-proceeding simulation tests.

8. The method of claim 7 further including the step of moving the simulation tests back in time, to allow a segment of the simulation test to be reviewed.

9. The method of claim 8 further including the step of restarting the simulation test on the test pathways, to review at least a portion of the simulation test, to allow further analysis of a test event.

10. A method of using two-state simulator software for simulation of the initialization sequence of electronic device designs having state devices each with a value of 1 or 0 and an output, in which the software is capable of simultaneously executing a plurality of initialization simulation tests along separate test pathways, the method comprising the steps of:
    establishing the values of at least some of the state devices for a plurality of the active test pathways along which simulation tests are to be run, such that the values of the state devices are not identical in all of the active test pathways;
    initiating and completing the same simulation test along each active test pathway, to run the state devices through an initialization sequence; and
    after completion of the initialized simulation tests for each active test pathway, determining the values of the at least some of the state devices at their outputs, to allow analysis of whether the state device values converge to a single solution after initialization, regardless of their initial values, to test for electronic device design errors.

11. The method of claim 10 further including the step of comparing the determined state device values from the different active test pathways to determine whether the values of the state device converged to a single solution.

12. The method of claim 10 in which establishing the values of at least some of the state devices includes establishing the value of each state device.

13. The method of claim 10 in which establishing the values of at least some of the state devices includes establishing a value of 1 for each of the at least some of the state devices for a first active test pathway.

14. The method of claim 13 in which establishing the values of at least some of the state devices further includes establishing a value of 0 for each of the state devices with a value of 1 for the first active test pathway, for a second active test pathway, so that each tested state device is tested with both possible values.

15. The method of claim 14 in which establishing the values of at least some of the state devices further includes the step of randomly developing values of 1 or 0 for each of the state devices with a value of 1 for the first active test pathway and 0 for the second active test pathway, for another active test pathway.

16. The method of claim 15 in which establishing the values of at least some of the state devices further includes repeating the step of randomly developing values of 1 or 0 for each of the state devices, for each remaining active test pathway.

17. A method of using two-state simulator software for simulation of the initialization sequence of electronic device designs having state devices each with a value of 1 or 0 and an output, in which the software is capable of simultaneously executing a plurality of initialization simulation tests along separate test pathways, the method comprising the steps of:
    establishing the values of each of the state devices for a plurality of the active test pathways along which simulation tests are to be run, such that the values of the state devices are not identical in all of the active test pathways including establishing a value of 1 for each of the state devices for a first active test pathway, and establishing a value of 0 for each of the state devices for a second active test pathway, so that each tested state device is tested with both possible values, and randomly establishing values of 1 or 0 for each of the state devices for at least one other active test pathway;

initiating and completing the same simulation test along each active test pathway, to run the state devices through an initialization sequence;

after completion of the initialized simulation tests for each active test pathway, determining the values of the at least some of the state devices at their outputs; and comparing the determined state device values from the different active test pathways to determine whether the values of the state device converged to a single solution to allow analysis of whether the state device values converge to a single solution after initialization, regardless of their initial values, to test for electronic device design errors.

* * * * *